Patented Apr. 24, 1945

2,374,220

UNITED STATES PATENT OFFICE 2,374,220

RESIN DISTILLATION

Donald A. Lister, Brunswick, Ga., assignor to Hercules Powder Company, Wilmington, Del., a corporation of Delaware No Drawing. Application December 27, 1940, Serial No. 372,002

1 Claim. (Cl. 260—106)

This invention relates to the production of new materials from pine wood resin containing at least 15% of gasoline-insoluble resins.

The prior art is concerned with the manufacture of rosin oil from rosin and use thereof in the manufacture of various materials such as lubricants and varnishes. The manufacture of rosin oil is disadvantageous because the yields of rosin pitch and rosin oil are not always desirably high, and the rosin oil and pitch so produced have not had properties adapting them for many uses. In addition, the properties and characteristics of the products have been subject to wide variation in quality and to premature deterioration upon use.

It is an object of the present invention to provide an improved pine wood resin oil having new and improved properties adapting it for wide use in the arts. Another object is to make available an improved pine wood resin pitch. Another object is to devise a process for producing such materials.

In accordance with the present invention, these objects are accomplished by destructive distillation of a resin derived from pine wood and which contains at least about 15% of gasoline-insoluble resinous material.

The resinous material employed in carrying out the present invention is characterized by being substantially completely resinous throughout, and by a content of at least 15% by weight, and preferably at least about 35% by weight of gasoline-insoluble resinous material. The material is further characterized by being almost completely soluble in such liquid aromatic solvents as benzene, toluene, xylene, etc.

The total resinous extract of pine wood, such as is obtained by extracting pine wood with benzene, consists of pale rosin, gasoline-insoluble resinous material, and color bodies. Frequently such extract contains 15% or more of gasoline-insoluble resinous material. Upon the treatment of such resinous extract to separate therefrom a fraction of pale rosin, there is formed one or more fractions containing the balance of the resinous material derived from the pine wood. My invention may use one or more of such remaining fractions as the raw material. Such raw material may be derived by the purification of wood rosin and is characterized by a relatively high content of gasoline-insoluble resinous material, that is, at least 15% and usually at least 35%. The non-rosin portion of the pine wood extract may be separated by appropriate processes into a fraction of substantially gasoline-insoluble resinous material and a dark-colored intermediate fraction lying between the substantially gasoline-insoluble fraction and rosin. It is impossible to effect an absolutely clean separation between the gasoline-insoluble resinous material and the rosin. By the preparation of a dark-colored intermediate fraction containing some gasoline-insoluble resinous material and the color bodies, a very good separation of the pine wood extract into rosin, gasoline-insoluble resinous material, and into this intermediate fraction, is effected.

I may use as the resinous raw material a resinous material obtained from pine wood and containing from about 15% to about 35% of gasoline-insoluble resinous material. The total extract from deciduous pine wood frequently contains at least about 15% of gasoline-insoluble resinous material, and when it does may be employed as the resinous raw material in carrying out the present invention. However, I prefer to use the dark-colored intermediate fraction largely insoluble in petroleum hydrocarbons and obtained by the refining of impure wood rosin to pale grades by means of a selective solvent for color bodies such as furfural, or a selective adsorbent such as fuller's earth. Such an intermediate fraction contains at least 35% and usually at least 50% by weight of gasoline-insoluble resinous material. Still further, I may use the substantially completely gasoline-insoluble resinous material derived from pine wood and which contains at least about 85% by weight of gasoline-insoluble resinous material. Mixtures of the foregoing resinous raw materials and equivalent resinous materials may be employed. As an example of such a mixture, I may use a blend of the dark-colored intermediate fraction and the substantially gasoline-insoluble fraction, obtained, for example, from pine wood without separation into the individual fractions, either by a process which involves leaving the rosin in the wood or by a process which involves separation of the rosin. The raw material preferably contains at least about 35% of gasoline-insoluble resinous material, varying therefrom up to about 100%. Within this range, it is preferable to employ as the raw material pine wood resin containing from about 50% to about 75% of gasoline-insoluble resinous material.

The dark-colored fraction referred to above is a product resulting from the process used in decolorizing rosin. For example, so-called FF rosin, which is ruby red in color and is derived from pine wood by extraction with benzene followed by evaporation of the benzene and extraction of the resinous residue with a petroleum hydrocarbon such as hot petroleum either or hot gasoline, is decolorized by adding furfural to the hot solution, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural, the residue remaining being the dark-colored intermediate fraction referred to. This fraction contains most of the coloring bodies and a major proportion of the unsaponifiables from the original FF rosin as well as a good proportion of the rosin acids. It contains a large proportion of oxidized rosin acids and therefore is only partially soluble in petroleum hydrocarbon solvents at room temperature. The percentage of gasoline-insolubles varies from about 35% to about 75% by weight. It has a higher flow point, a much higher viscosity, lower acid number, and a higher unsaponifiable content than FF wood rosin. However, the saponification number is not correspondingly lower, indicating a high ester content. In addition, it is non-crystallizing. Such a fraction is characterized by the following approximate analysis:

| | | |
|---|---|---|
| Unsaponifiables | per cent | 10-20 |
| Gasoline insolubles | do | 35-75 |
| Acid number | | 100-130 |
| Saponification number | | 140-150 |
| Melting point (drop) | °C | 85-95 |

A typical example of such a fraction had the following analysis: Acid number, 124; saponification number, 150; melting point (drop), 89° C.; gasoline insoluble, 57%; unsaponifiable matter, 12%; Lovibond color, dark; ash content, 0.03%.

The substantially gasoline-insoluble fraction referred to above may be prepared from pine wood by the processes set forth in U. S. patents to Hall, Nos. 2,193,026 and 2,221,540. This fraction is characterized by being substantially completely insoluble in petroleum hydrocarbons such as gasoline. The gasoline-soluble portion of this fraction rarely exceeds 15% by weight. This fraction may be said to be the gasoline-insoluble resin contained in pine wood. For example, the extraction of pine wood with benzene yields a mixture of this fraction and FF rosin. Upon commingling the molten resinous mixture with a mixture of gasoline and a relatively small volume of furfural, the fraction in question goes into solution in the furfural while the FF rosin goes into solution in the gasoline. The two layers are allowed to separate and the resinous materials may then be recovered from the respective layers in any suitable manner.

The substantially completely gasoline-insoluble fraction is in general characterized by a methoxy content of from about 3% to about 7.5%, an acid number of from about 90 to about 110, a melting point (drop method) of from about 95° C. to about 125° C., petroleum ether or gasoline-insolubility of about 85% or more, and a saponification number of from about 135 to about 145. A typical specimen had the following characteristics: Drop melting point, 115° C.; acid number, 93; gasoline-soluble matter, 12%; toluene insoluble matter, 20%; saponification number, 140; ash content, 0.02%.

In general, the resinous raw material which is employed in carrying out the present invention and which is typified by the dark-colored intermediate fraction of color bodies referred to at length above, or the substantially completely gasoline-insoluble fraction, or blends thereof, may be defined as a resin naturally occurring in pine wood and characterized by a gasoline-insolubility of 15% or more, and preferably 35% or more, unspanonifiable content of from about 5% to about 20%, melting point above 85° C. and preferably above about 90° C., and an acid number of not over about 140.

In accordance with the present invention, the resinous raw material is destructively distilled, preferably in an inert atmosphere such as carbon dioxide, and in either the presence or absence of a decarboxylating catalyst. An example of a preferred decarboxylating catalyst is p-toluene sulfonic acid. Examples of other decarboxylating catalysts are: fuller's earth, zinc chloride, phosphoric acid, benzene sulfonic acid, phosphorous pentoxide, and sodium acid sulfate.

The resin is destructively distilled at a temperature sufficient to effect formation of a resinous oil by decomposition of the resin and sufficient to form a residual pitch in the still. Distillation temperatures ranging from about 300° C. to about 400° C. are operable, the preferred temperature range covering from about 330° C. to about 375° C., and still more preferably from about 355° C. to about 370° C. In general, temperatures below about 355° C. do not cause the desired decomposition of the resinous raw material, while temperatures above about 370° C. tend to produce free carbon in the residue which is undesirable. Heating periods of from about 30 minutes to about 25 hours are operable depending upon the temperature and pressure maintained, size of charge, presence or absence of decarboxylating catalyst, etc. In general, the distillation is continued until the resin has been sufficiently decomposed to form a pitch. Generally, the distillation will be stopped at a point prior to formation of coke in the still, since such coke formation is undesirable. The distillation may be effected either by superheated steam or by direct fire under the still or by both. The distillation may be conducted at subatmospheric pressure, atmospheric pressure, or at super atmospheric pressure.

The distillate comprises non-condensable gases, spirits, or low boiling material boiling below about 100° C., a substantial amount of water, and an oily material boiling above 100° C. Preferably the oily portion of the distillate boiling above the boiling point of water is separated from the aqueous portion in any suitable manner and constitutes the resin oil. If desired, this oily portion of the distillate may be completely freed from any traces of water in any suitable manner as for example, by heat or by suitable chemical treatment. The oily portion may be re-distilled, if desired, for further purification and the product passing over below a vapor temperature of about 250° C. (at atmospheric pressure) collected. Alternatively, that portion of the distillate from the destructive distillation which passes over below a vapor temperature of about 200–220° C. may be collected and employed without redistillation.

The destructive distillation may suitably be carried out under reduced pressure (for example 110–600 mm. of mercury, with rapid removal and condensation of distillate). The distillation may be conducted at atmospheric pressure provided the temperature in the still is carefully controlled. Destructive distillation may be followed by steam distillation using superheated steam. Or superheated steam may be employed throughout the distillation, whether at subatmospheric, atmospheric, or superatmospheric pressure. Distillation may take place in the presence of an inert atmosphere such as carbon dioxide, steam, nitrogen, etc.

The employment of superatmospheric pressure is advantageous because it maintains the temperature of the charge at the desired level and increases the rate of decomposition of the charge. The pressure employed may vary upwardly from atmospheric up to say about 100 atmospheres.

The pressure may be maintained constant throughout the distillation or may be varied as the distillation proceeds, in accordance with the results desired.

An alternative procedure consists in heating the resinous raw material in a closed space, allowing pressure to build up as decomposition takes place, followed by distillation of the reaction mixture in any suitable manner to remove the non-condensable gases, the water, the spirits, and the oils.

The distillation may be stopped prior to complete decomposition of the resinous raw material, for example, at a point where the amount of residual pitch formed varies from say about 30% to about 75% by weight of the original resinous material depending upon the properties desired in the pitch.

The yield of pitch ranges upwardly from about 30% by weight based on the weight of original resin. The yield of resin oil may range from about 20% to about 60% by weight of the original resin. The percentage of water will usually run from about 5% to about 15% by weight. The percentage unaccounted for (non-condensable gases, spirits, and mechanical losses) will usually range from about 5% to about 20% by weight of the original resin.

The relative proportions of resin oil and pitch obtained by the distillation will depend upon the particular raw material employed, the temperature of treatment, and other factors. Generally speaking, however, the percentage of oil obtained will vary between about 10% and about 100% by weight of the pitch.

While the distillation will generally be conducted by a batch operation, it may with suitable modification be effected by continuous operation, for example, with a still into which molten resinous raw material is continuously passed and subjected to a temperature from about 300° C. to about 400° C. while continuously removing and cooling the distillate. Continuous operation in any other suitable manner may equally be used for carrying out the process.

The products of the present invention are capable of wide application in the arts. The resin oil products may be used in the manufacture of cable insulation, transformer oils, printing inks, greases and lubricants, varnishes and similar coating compositions, in oilcloth and linoleum, in brewers' pitch, in place of creosote in the preservation of wood and in flotation processes, in the manufacture of and reclaiming of rubber, etc. The oils are characterized by a substantial content of phenolic constituents or derivatives, this content increasing with the content of gasoline-insoluble in the original resinous raw material. The pitch produced may be employed in the protection of rope, cordage and the like, in the manufacture of oakum, in rubber compounding, in the manufacture of so-called tar tape, in the manufacture of formaldehyde resins to which it is particularly suited because of its high content of phenolic constituents, in brewers' pitch, etc. The products of the present invention are extremely resistant to influences which normally tend to decompose and deteriorate the usual rosin oil or rosin pitch, such as weathering, heat, light, moisture, water, chemical influences, etc.

The oily products of the present invention are characterized in general by complete freedom from acetic acid or other volatile or undesirable organic acids, a substantial content of phenolic bodies, a saponification number below 100 and usually below 60, an acid number below 50 and usually below 30, a methoxy content of from about 1% up to about 6%, substantially complete solubility in benzene and the like, boiling point range of from about 200° C. to about 360° C., relatively high gasoline-insolubility, specific gravity above 1.0, and refractive index of from about 1.540 to about 1.570. Rosin oil typically has a refractive index of about 1.530.

The pitchy products of the present invention are characterized by complete freedom from acetic acid or other volatile or unstable organic acids, a very substantial content of phenolic bodies, a saponification number below 100 and usually below 60, an acid number of from about 30 to about 50, an unsaponifiable content of at least about 50%, a methoxy content of from about 1% to about 6%, substantially complete solubility in benzene and the like, and a substantial content of gasoline-insoluble material, this content depending upon the gasoline-insoluble content of the resinous raw material.

Below are given several specific examples in accordance with the present invention.

Example 1

A charge of dark-colored pine wood resinous fraction (gasoline-insoluble 57%) weighing 600 g. was distilled at 330–360° C. for 7¼ hours in an atmosphere of carbon dioxide; the volatile oils and water which distilled off were continuously condensed and separated. Yields of 9% of resin oil, 5% of water, and 80% of residual pitch were obtained.

Example 2

A mixture of 450 g. of dark-colored pine wood resinous fraction (gasoline-insoluble 57%), 150 g. of substantially completely gasoline-insoluble pine wood resin (gasoline-insoluble 88%), and 0.6 g. of p-toluene sulfonic acid was charged into a still and distilled at 340–360° C. for one hour in an atmosphere of carbon dioxide. The oils and water which distilled off were separated. Yields of 21% oils, 4% water and 65% residual pitch were obtained.

Example 3

A charge of dark-colored pine wood resin (gasoline-insoluble 51%) weighing 1750 g. was distilled in an atmosphere of carbon dioxide at 360° C.

for 4½ hours. The yields were 1300 g. pitch, 140 g. oils, and 82 g. of water.

Example 4

A charge of 1560 gallons of molten dark-colored pine wood resinous fraction (gasoline-insoluble 53–55%) was placed in a direct fired still and heated to 360° C. 8 hours were required to reach this temperature. The charge was distilled at this temperature for 3 hours. The entire distillate comprising water and oils was continuously removed and condensed. The condensate comprised 20 gallons of water and 748 gallons of oils. The residual pitch had a volume of 752 gallons or 48.1% by volume of the original resin.

Example 5

A charge of 1565 gallons of molten dark-colored pine wood resinous fraction (gasoline-insoluble 62%) was placed in a still, brought to 360° C. and distilled at this temperature for one hour. The condensate contained 687 gallons of oils and the residual pitch amounted to 813 gallons.

Example 6

A mixture of 600 g. of substantially gasoline-insoluble pine wood resin (gasoline-insoluble 92%) and 0.6 g. of p-toluene sulfonic acid was distilled at 340–360° C. in an atmosphere of $CO_2$ for ¾ hour. The oils (129 cc.) and the water (30 cc.) which distilled off were condensed and separated from one another. The residual pitch amounted to 345 g.

Example 7

A mixture of 600 g. of dark-colored pine wood resinous fraction (gasoline-insoluble 57%) and 0.6 g. of p-toluene sulfonic acid was heated at 340–360° C. for one hour in an atmosphere of $CO_2$. Yields of 21% oils, 4% water, and 65% residual pitch were obtained.

Example 8

A mixture of 300 g. of dark-colored pine wood resinous fraction (gasoline-insoluble 58%) and 300 g. of substantially gasoline-insoluble pine wood resin (gasoline-insoluble 92%) was distilled at 340–360° C. for four hours in an atmosphere of $CO_2$. Yields of 15% oils, 5½% water and 70% of pitch were obtained.

Example 9

A 200 g. lot of substantially gasoline-insoluble pine wood resin (gasoline-insoluble 90%) was destructively distilled by heating on a sand bath under atmospheric pressure up to about 380° C. The condensed distillate comprised 80 g. of oils. The residual pitch amounted to 90 g.

Example 10

A lot of 200 g. of substantially gasoline-insoluble pine wood resin (gasoline-insoluble 89%) was distilled at atmospheric pressure, cooling all of the distillate up to distillate vapor temperature of 220° C. The conduct of the distillation was as follows:

| Elapsed time, minutes | Temp. distillate, °C. | Temp. of still, °C. |
|---|---|---|
| Started | | |
| 11 (defoaming completed) | 145 | 232 |
| 16 | 156 | 304 |
| 21 | 216 | 332 |
| 26 | 210 | 332 |
| 31 | 206 | 338 |

The oils in the condensate amounted to 41.5 g. or 20.75% on the weight of the resinous raw material, the water to 10.5 g., and the pitchy residue to 127.5 g. Unaccounted for was 20.5 g.

Example 11

A 200 g. lot of substantially gasoline-insoluble pine wood resin (gasoline-insoluble 92%) was destructively distilled under reduced pressure which ultimately approached 160 mm. Hg.

| Elapsed time, minutes | Temp. distillate, °C. | Absolute pressure (mm. Hg) |
|---|---|---|
| Started | | |
| 15 (defoaming completed) | 186 | |
| 20 | 186 | 520 |
| 25 | 200 | 380 |
| 30 | 200 | 240 |
| 35 | 260 | 160 |
| 40 | 203 | 150 |
| 45 | 250 | 160 |
| 50 | 242 | 160 |
| 55 (completion) | 229 | 150 |

The oils amounted to 60 g., the water to 11 g., and the residual coke to 108 g., and the unaccounted for to 11 g.

Example 12

A 200 g. lot of substantially gasoline-insoluble pine wood resin (gasoline-insoluble 88%) was distilled in accordance with the following schedule, all of the oils up to a distillate vapor temperature of 220° C. being distilled off prior to the introduction of superheated steam.

| Elapsed time, minutes | Temp. distillate, °C. | Temp. of still, °C. |
|---|---|---|
| Started | | |
| 15 (defoaming completed) | 143 | 215 |
| 20 | 173 | 315 |
| 25 | 220 | 326 |
| 30 | 196 | 326 |
| 35 (introduction of steam commenced) | 185 | 326 |
| 40 | 192 | 315 |
| 45 | 221 | 315 |
| 50 | 191 | 310 |
| 60 | 200 | 315 |
| 65 | 219 | 315 |
| 70 | 227 | 321 |
| 75 | 245 | 321 |
| 85 | 249 | 326 |
| 90 | 250 | 338 |
| 95 (completion) | 250 | 365 |

The oily portion of the distillate amounted to 65 g. while the coke in the still amounted to 85 g.

Example 13

In this example, a 200 g. lot of substantially gasoline-insoluble pine wood resin (gasoline-insoluble 93%) was subjected to destructive distillation using superheated carbon dioxide, the introduction of which was begun after defoaming had been completed.

| Elapsed time, minutes | Temp. distillate, °C. | Temp. of still, °C. |
|---|---|---|
| Started | | |
| 10 (defoaming completed) | 122 | 182 |
| 13 (introduction of $CO_2$ begun) | 136 | 204 |
| 18 | 159 | 293 |
| 23 | 185 | 304 |
| 28 | 196 | 315 |
| 33 | 229 | 332 |
| 38 | 222 | 326 |
| 43 | 222 | 332 |
| 48 | 223 | 338 |
| 53 | 219 | 338 |
| 58 (completion) | 243 | 360 |

The oils amounted to 73 g., water to 14 g., residual coke to 83.5 g., and unaccounted for to 29.5 g.

Example 14

A 200 g. lot of substantially gasoline-insoluble pine wood resin (gasoline-insoluble 90%) was destructively distilled employing extremely careful temperature control, the distillation proceeding in accordance with the following schedule:

| Elapsed time, minutes | Temp. distillate, °C. | Temp. of still, °C. |
|---|---|---|
| Started | | |
| 10 (defoaming completed) | 169 | 260 |
| 15 | 220 | 321 |
| 20 | 262 | 338 |
| 25 | 287 | 360 |
| 30 | 269 | 393 |
| 35 (completion) | 254 | 393 |

The yields were oils 82 g., water 14.5 g., residual coke 78.5 g., and unaccounted for 25.0 g.

It will be seen from the foregoing examples that if the distillation is carried out at a high temperature or for a prolonged period of time, the residual pitch is converted to coke. When this procedure is followed, the yield of oils is somewhat higher, but the yield of the valuable pitch is eliminated. Therefore, it will generally be preferred to carry out the distillation at such a temperature and for such a period of time that conversion of the residue to coke does not occur.

Example 15

A lot of 400 g. of the total resinous extract from pine wood obtained by extracting pine wood with an aromatic solvent such as benzene having a gasoline-insoluble figure of 18.3% was destructively distilled on a sand bath in accordance with the following schedule.

| Elapsed time, minutes | Still temp., °C. | Distillate temp., °C. |
|---|---|---|
| 45 (first drop) | 210 | Water |
| 100 | 282 | 165 |
| 160 | 290 | 120 |
| 220 | 348 | 260 |
| 240 [1] | 352 | 258 |
| 260 | 242 | 323 |
| 270 (completion) | 341 | 320 |

[1] 0.4 g. of para-toluene sulfonic acid was added to bring about the reaction more rapidly. At this point only 50 cc. of distillate had been obtained.

The following yields were obtained:

| | Per cent |
|---|---|
| Pitch | 55.2 |
| Oils | 23.8 |
| Water | 4.8 |
| Unaccounted for | 16.2 |

The pitches produced in accordance with the present invention are characterized by a relatively high gasoline-insolubility, which is in general proportional to the gasoline-insolubility of the original resin. Thus, the pitch obtained from "No. 3" wood resin which is the total resinous extract from pine wood obtained by extracting the pine wood with an aromatic solvent such as benzene contained 6.3% gasoline-insoluble, that from a series of distillations of the intermediate resin of 35–75% gasoline-insoluble contained on an average about 32% gasoline-insoluble, while that from the substantially gasoline-insoluble resin (85% or over gasoline-insoluble) contained over 75% of gasoline-insoluble.

Comparative analyses of typical resin oils produced by the present invention with rosin oil are as follows:

| | Typical rosin oil | Typical resin oil produced from intermediate resin (35–75% G. I.) | Typical resin oil produced from substantially gasoline-insoluble resin (85% or more G. I.) |
|---|---|---|---|
| Acid number | 17.19 | 25.0 | 35.0 |
| Saponification number | | 41.0 | 100.0 |
| Benzene insoluble | Nil | 0.1% | Nil |
| Flash point | 99° C. | 93° C. | |
| Viscosity (Saybolt) | 160 sec. at 100° F. | 18.4 sec. at 50° C. | |
| Sp. gr. 20.0/15.6 | 0.9742 | 1.031 | 1.05 |
| Iodine number | 25 | | .65 |
| Boiling range | 5%–95%, 90%–360° C. | 5%–226° C., 10–271, 20–215, 30–334, 40–341, 50–345, 60–349, 70–353, 80–262 temperature dropped. | |

These analyses are only representative of the oils as the analysis of an individual oil is dependent upon the particular resin distilled and the particular method of distillation. However, they generally indicate the marked differences between the resin oils produced by the present invention and rosin oil.

In the copending application of P. A. Ray, Serial No. 360,263, filed October 8, 1940, there is described the manufacture of a tar by blending the oily distillate with the pitchy residue. In the copending application of P. A. Ray, Serial No. 363,700, filed October 31, 1940, the use of such a tar as a rubber softener is described and claimed.

It will be understood that the details and examples hereinbefore set forth are illustrative only and that the invention as broadly described and claimed is in no way limited thereby.

What I claim and desire to protect by Letters Patent is:

As a new article of manufacture, a resin oil constituting the oily distillate derived by destructive distillation of a pine wood resin containing at least about 85% of gasoline-insoluble resinous material at a temperature sufficient to effect formation of a distillable resin oil and a residual pitch by decomposition of the resin for a sufficient length of time to decompose said resin to resin oil and to resin pitch, the said oil being further characterized by having substantially complete freedom from acetic acid, a methoxy content of from about 1% to about 6%, a content of phenolic bodies a boiling-point range of from about 200° C. to about 360° C., a refractive index of from about 1.540 to about 1.570 and substantially complete solubility in benzene.

DONALD A. LISTER.